US010828594B2

(12) United States Patent
Ramos De La Fuente (10) Patent No.: US 10,828,594 B2
(45) Date of Patent: Nov. 10, 2020

(54) SYSTEM FOR TRANSFERRING MASS WITH THE CAPTURING OF SOLIDS VIA THE INDUCTION OF AN ELECTROMAGNETIC FIELD

(71) Applicants: Aldo Adolfo Mizrahi Aksiyote, Mexico City (MX); Carlos Higareda Juárez, Mexico City (MX); Rubén Ramos De La Fuente, Mexico City (MX)

(72) Inventor: Rubén Ramos De La Fuente, Mexico City (MX)

(73) Assignees: Aldo Adolfo Mizrahi Aksiyote, Mexico City (MX); Carlos Higareda Juarez, Mexico City (MX); Ruben Ramos de la Fuente, Mexico City (MX)

( * ) Notice: Subject to any disclaimer, the term of this patent is extended or adjusted under 35 U.S.C. 154(b) by 362 days.

(21) Appl. No.: 16/063,233

(22) PCT Filed: Dec. 17, 2015

(86) PCT No.: PCT/IB2015/059703
§ 371 (c)(1),
(2) Date: Jun. 15, 2018

(87) PCT Pub. No.: WO2017/103656
PCT Pub. Date: Jun. 22, 2017

(65) Prior Publication Data
US 2019/0134555 A1    May 9, 2019

(51) Int. Cl.
*B01D 53/22* (2006.01)
*B01D 47/18* (2006.01)
(Continued)

(52) U.S. Cl.
CPC .............. *B01D 47/18* (2013.01); *B01D 53/18* (2013.01); *B01D 53/185* (2013.01); *F24F 6/06* (2013.01)

(58) Field of Classification Search
CPC ......... F24F 6/06; B01D 53/185; B01D 53/18; B01D 47/18
See application file for complete search history.

(56) References Cited

U.S. PATENT DOCUMENTS 3,305,224 A    2/1967 Piotrowski
3,625,795 A *  12/1971 Knechtges ............ D06M 17/06
                                         156/241
(Continued)

FOREIGN PATENT DOCUMENTS

CN    203922783 U    11/2014
EP    1547664 A1     6/2005
(Continued)

OTHER PUBLICATIONS

International Search Report dated Aug. 31, 2016 in parent application PCT/IB205/059703.
(Continued)

*Primary Examiner* — Anthony R Shumate
(74) *Attorney, Agent, or Firm* — Polsaon Intellectual Property; Margaret Polson (57) ABSTRACT

The invention relates to a system for transferring mass with the capturing of solids via the induction of an electromagnetic field, comprising a plurality of cells formed in a plurality of discs forming an assembly of means for generating a membrane and electromagnetic field. The liquid membranes formed in this assembly collapse upon contact with a gaseous current. The collapsed liquid material covers the suspended particles and removes same via decanting, and the cells of the membrane also increase the speed of the gaseous current and cause same to impinge on the surface of the liquid, thereby improving the transferral of the vapour to the gas. The system also has means for generating an electromagnetic field that are electrically energised in order to provide an electromagnetic field to the assembly, such that (Continued)

the solids circulating after the rupture of the liquid membrane are attracted to each disc depending on the ionic behaviour thereof. The system also has means for capturing solids that are radially adjusted in the space between discs, and means for removing solids that are adjusted to the capturing means for removing or carrying the captured solids.

21 Claims, 5 Drawing Sheets

(51) Int. Cl.
    *F24F 6/06*     (2006.01)
    *B01D 53/18*     (2006.01)

(56) References Cited

U.S. PATENT DOCUMENTS

| | | | | |
|---|---|---|---|---|
| 3,808,088 | A * | 4/1974 | Knechtges | D06M 17/04 |
| | | | | 428/198 |
| 4,000,992 | A | 1/1977 | Cole, Jr. | |
| 4,036,597 | A | 7/1977 | Filss | |
| 4,246,376 | A * | 1/1981 | Didomenico, Jr. | C09D 161/32 |
| | | | | 525/398 |
| 4,400,220 | A | 8/1983 | Cole, Jr. | |
| 4,451,622 | A * | 5/1984 | DiDomenico, Jr. | C08L 75/04 |
| | | | | 252/182.26 |
| 4,456,737 | A * | 6/1984 | DiDomenico, Jr. | C08G 12/42 |
| | | | | 525/398 |
| 4,456,747 | A * | 6/1984 | DiDomenico, Jr. | C07C 31/272 |
| | | | | 525/398 |
| 4,656,061 | A * | 4/1987 | DiDomenico, Jr. | |
| | | | | C08G 65/2609 |
| | | | | 427/385.5 |
| 4,810,521 | A * | 3/1989 | Robertson | B05D 1/04 |
| | | | | 427/379 |
| 4,844,842 | A | 7/1989 | Markl et al. | |
| 4,898,747 | A * | 2/1990 | Robertson | B05D 1/04 |
| | | | | 427/379 |
| 5,945,038 | A | 8/1999 | Anderson | |
| 6,419,954 | B1 * | 7/2002 | Chu | A61K 9/2031 |
| | | | | 424/465 |
| 6,500,629 | B1 * | 12/2002 | Cleaver | G01N 33/566 |
| | | | | 422/527 |
| 7,399,343 | B2 | 7/2008 | Ramos de la Fuente | |
| 2001/0015501 | A1 | 8/2001 | Katagiri et al. | |
| 2003/0044443 | A1 * | 3/2003 | Erickson, Jr. | A01N 35/02 |
| | | | | 424/409 |
| 2018/0029043 | A1 * | 2/2018 | Henriquez Prevoo | B03C 3/01 |

FOREIGN PATENT DOCUMENTS

| | | |
|---|---|---|
| MX | 264635 | 9/2002 |
| WO | 2004026440 A1 | 4/2004 |

OTHER PUBLICATIONS

Written Opinion of the International Searching Authority dated Aug. 31, 2016 in parent application PCT/IB205/059703.

\* cited by examiner

SYSTEM FOR TRANSFERRING MASS WITH THE CAPTURING OF SOLIDS VIA THE INDUCTION OF AN ELECTROMAGNETIC FIELD

FIELD OF THE INVENTION

The present invention relates to a system and apparatus for transferring vapor molecules from a liquid to a gas stream through collapsible aqueous liquid membranes, and where, furthermore, the collection of liquid-suspended solids is boosted by electromagnetic field induction.

The present invention is applicable to a plurality of applications, however, it will be described herein in an exemplary manner with reference to desalinators and humidifiers, wherein liquid (water) molecules are transferred by mass transfer phenomena, to a gas (air) stream in contact with said liquid, and besides, solids (mineral salts and dust) are collected.

BACKGROUND OF THE INVENTION

Mass transfer is a phenomenon that has many applications, as in the desalination plants or environmental control systems, to name just a couple of examples.

In the case of desalination or desalting plants, the objective is to separate and remove salt from seawater to obtain drinking water. Seawater contains mineral salts dissolved therein, and as such it is not potable for human consumption. Even, drinking large quantities of seawater can cause death. It is known that 97.5% of the planet's water is salt water and only an amount below 1% is suitable for human consumption. Making seawater potable is one of a number of possible solutions to drinking water shortage. Since some time now, seawater desalination plants have produced drinking water, but the process is costly and it is relatively seldom used. Currently there is a production of over 24 million cubic meters per day of desalinated water all over the world. The main disadvantages of the current desalination plants are that the salt extraction process produces saline residues and polluting substances that endanger flora and fauna. Another disadvantage is that the desalination process involves a high-energy consumption cost, either through reverse osmosis, distillation, freezing, flash evaporation, hydrates formation or electrodialysis processes. It is known that the average cost of the most efficient desalination process per cubic meter of drinking water is about 5 to 15 dollars.

In this respect, there is a plurality of patents related to desalination plants. For example, the Chinese Patent application describes to an electrodialysis seawater desalination apparatus using a means of electromagnetic separation having upper and lower electrodes connected with a magnetic pole, and a vertical outlet connection tube allowing water to flow through the pipe. On the other hand, the Chinese utility model CN203922783U relates to a salt removal electromagnetic device, having an evaporation tank provided with a reservoir body provided with a steam outlet port, and a controller connected to the reservoir body, wherein outlet steam port ends are connected to two pipeline units. The disadvantage of said documents is that the electromagnetic effect over the salt particles is carried out by independent anion-cation arrangements, and that the potential of other mass transfer mechanisms are not harnessed.

In an exemplary manner, regarding environment control systems, atmospheric air is a mixture of dry air and steam, which is called humid air. This gas mixture is the one that is conditioned in environmental control systems by means of humidifiers and air conditioning equipment. According to some standards, humidity is a determining factor of human comfort. It is known that between 20° C. and 26° C., an indoors environment is comfortable as long as humidity in air is kept between 30 and 70%. Therefore, it follows that the necessity for humidifiers is a contributor to human comfort.

In this respect, the U.S. Pat. No. 4,844,842 describes an apparatus of this kind. According to said patent, the moistened material consists of a rotary disk. The bottom of the disk is submerged in a water bath or in an aqueous liquid while the top is in contact with an air stream. When said disk rotates, the top is submerged in the liquid while the submerged portion emerges as a wet portion, and is contacted with the air stream. U.S. Pat. No. 5,945,038 relates to an evaporative humidifier comprising an absorbent material where a portion of the humidification material is submerged, and the upper portion is exposed to air, in said patent the use of a float valve to control the water supply is also described. Therefore, as it is evident from these patents and other existing humidifiers there is a disadvantage in that pollutants contained in air streams are not removed, thus in said humidifiers pollutants are entrained by the humidified air. Another disadvantage resides in that said humidifiers lack elements for retaining or capturing suspended solids, such as dust. On the other hand, in the case of evaporation vaporizers, even when dust in the humidified material is removed by filtration, said dust in contact with the humidified material results in the occurrence of fungus, algae and aerobic germs. Also, over time, the dust accumulated on the humidified material has a tendency to block air circulation through the humidified material, thus affecting transfer of water to the vapor stream.

In order to remove solids such as dust, different types of filters are known. Also, the use of foam to control dust content in mine environments is known, for example in coal mines. The foam is generated by ejectors, where it is mixed with an air stream and water stream at high velocity. In this respect, U.S. Pat. Nos. 4,000,992 and 4,400,220 describe a system for removing dust by bubbles in a cyclone. However, there is a lack in the state of the art for an evaporator that further eliminates dust and pollutants from a humidified stream without generating fungus, algae and aerobic germs.

Finally, Mexican Patent 264635, developed by the present common applicant refers to a system and apparatus for transferring a mass from the liquid phase to the gas phase while removing pollutants characterized by comprising a plurality of liquid membrane generating cells, where said liquid membranes are collapsed by contacting a gas stream. The collapsed liquid material covers the suspended particles and removes them via decantation, where the membrane cells also increase the speed of the gas stream and cause said stream to impinge on the surface of the liquid, thereby improving the vapor transfer into the gas. However, such a system and apparatus does not envisage the capturing of solids through mass transfer, which otherwise can boost the scope and use of the mass transfer technology.

As a conclusion, there is a lack in the state of the art for a system and apparatus for implementing mass transfer for both gas and liquids, as well as for solids by using a magnetic field generation in order to attract metal ions according to a specific polarity, particularly focused on the mass transfer zone. Also, there are no equipment and systems identified so far that can be adapted in a flexible manner to a plurality of applications according to some variable elements.

OBJECTS OF THE INVENTION

An object of the present invention is to provide a system for transferring liquid molecules by evaporation to a gas stream in contact with the liquid.

Another object of the present invention is to implement, in said system, a mass transfer of solids, such as suspended particles, pollutants, or dust, by using magnetic field generation to attract metal ions according to a specific polarity.

Even another object of the present invention is that said system allows for capturing said solids for proper deposition or further usage.

Still further, another object of the present invention is that said system can be adapted to a plurality of uses and applications through flexibilization or by varying some factors.

A further object of the invention consists in providing an easy maintenance system, having a high-effective mass transfer capability, and which manufacturing and operating costs are reduced.

DETAILED DESCRIPTION OF THE INVENTION

Figure 1:
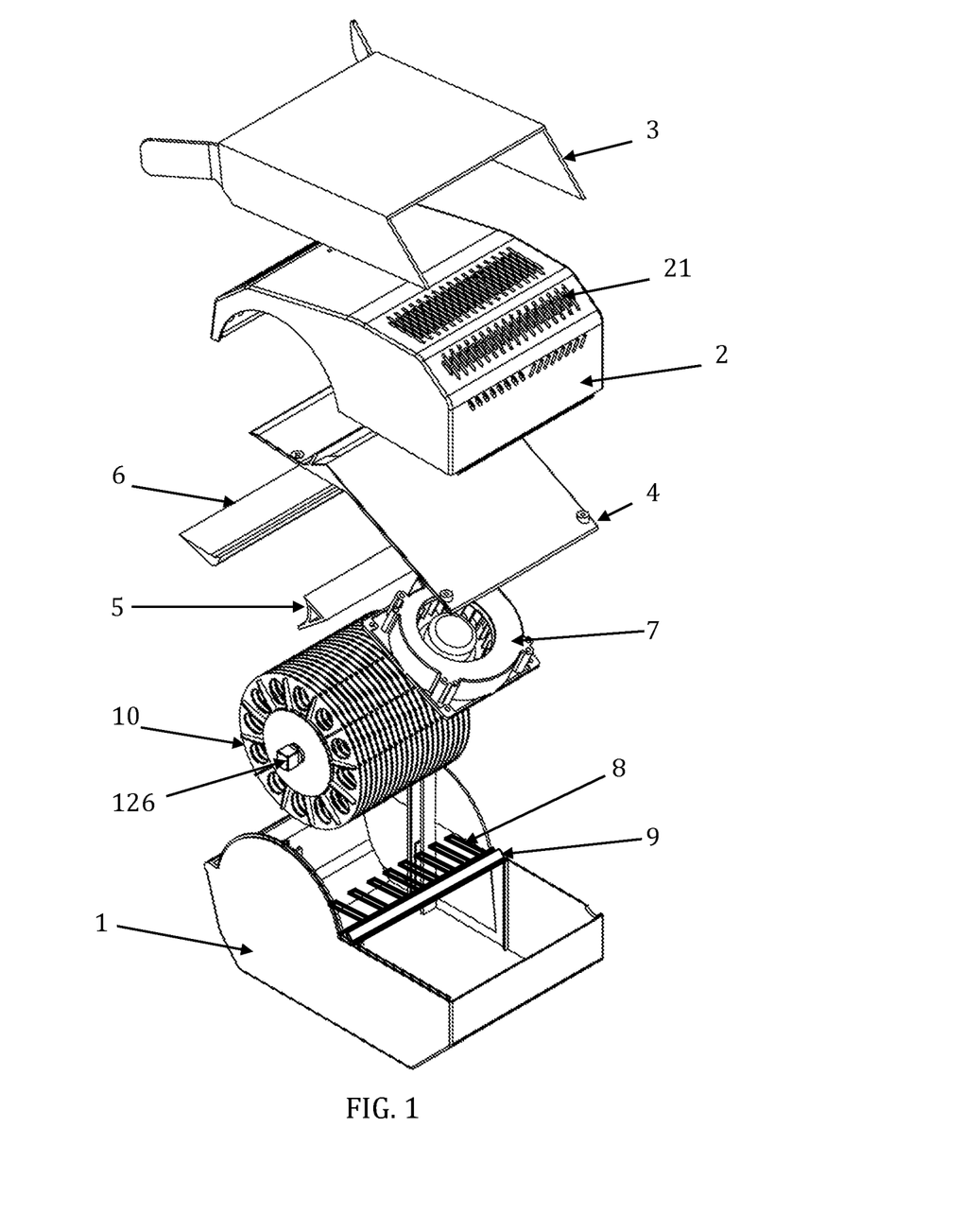
FIG. 1 corresponds to an exploded view of the mass transfer system with the capturing of solids via electromagnetic field induction of the present invention.
Figure 2:
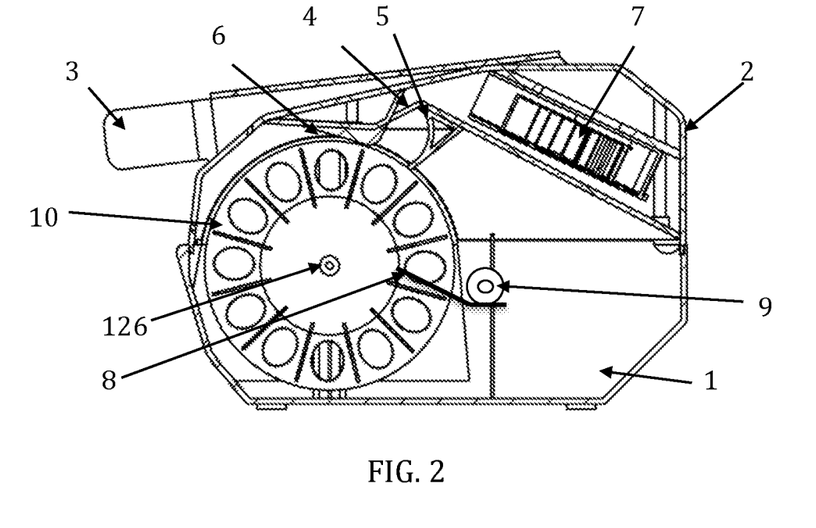
FIG. 2 corresponds to a sectional side view of the mass transfer system with the capturing of solids via electromagnetic field induction of the present invention.
Figure 3:
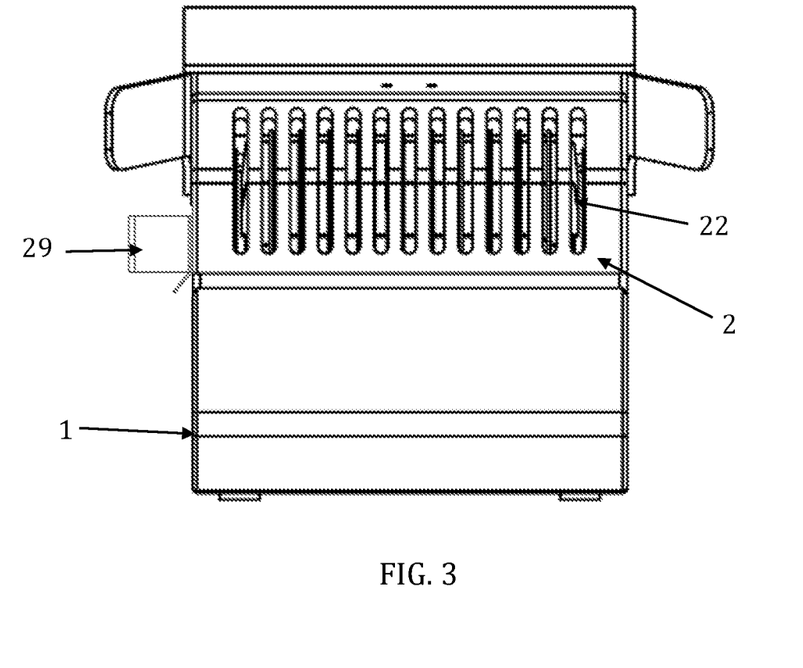
FIG. 3 corresponds to a front view of the mass transfer system with the capturing of solids via electromagnetic field induction of the present invention.

According to FIGS. 1 to 3, the mass transfer system of the present invention comprises a housing base (1), a housing cover (2), an upper cover (3), an internal deflector (4), a front deflector (5), a rear deflector (6), an air convection means (7), a solids capturing means (8), a solids removal means (9), and a membrane and electromagnetic field generation assembly (10).

The base (1) and cover (2) forming together the housing can be made of any material, such as, for example, metal, glass, wood or plastic. The base (1) allows for holding the liquid, with or without suspended solids, which will be treated by the system. The base (1), a portion of said base (1), or just the liquid held in the base (1) receives an electric charge, preferably a negative charge, which allows for capturing solids. The cover (2) has also supply slots (21) and ejection slots (22) thereon, through which gas enters and exits the system, respectively. Furthermore, cover (2) gives support to a hopper (29), which embodies a part of the solids capturing and collection system. Preferably, the material of the base (1) and cover (2) should not react chemically with said gas, liquid, or the solids that are transferred or collected.

The air convection means (7) comprises any means to force air or gas convection inside the system. FIGS. 1 and 2 show said means as an axial fan, however, any system that generates an airflow can be used, for example, a plunger, turbine, radial fan, blower, compressor, etc. Alternatively, an external air stream can be used, for example, a stream from a pipeline. The air or gas flow can be intermittent or continuous.

Figure 4:
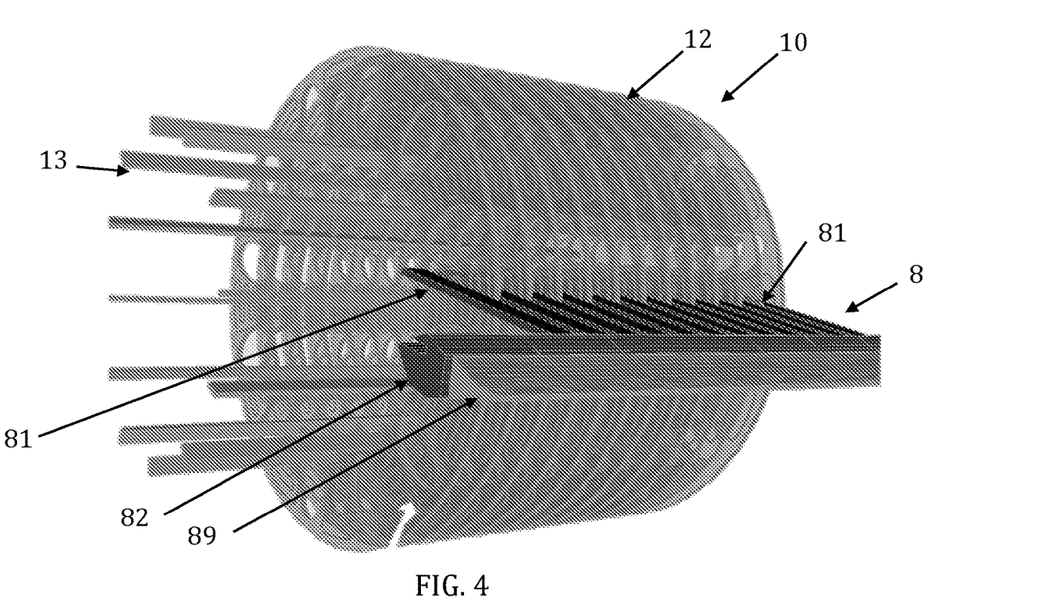
FIG. 4 corresponds to a perspective sectional view of the membrane and electromagnetic field generation means assembly of the mass transfer system with solids capturing of the present invention.
Figure 5:
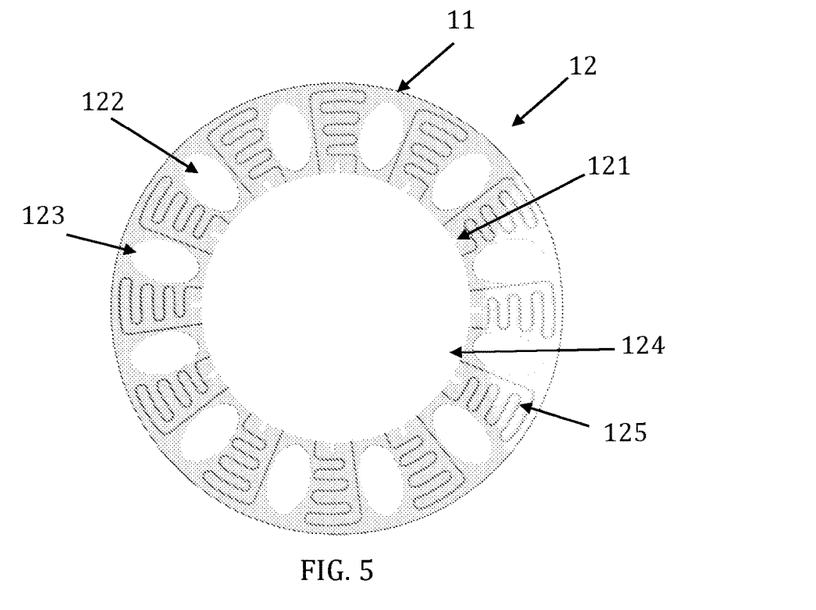
FIG. 5 corresponds to a front view of the membrane and electromagnetic field generation means of the mass transfer system with solids capturing of the present invention.
Figure 6:
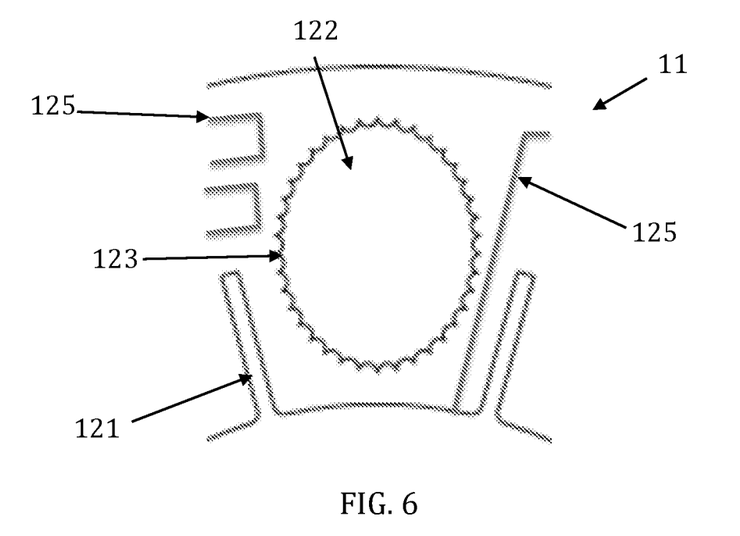
FIG. 6 corresponds to a detailed view of the membrane and electromagnetic field generation means of the mass transfer system with solids capturing of the present invention.

The air is forced to pass through the membrane and electromagnetic field generation means (10), which is best shown in FIGS. 4 to 6. Said means (10) comprise a plurality of membrane cells (11), providing surfaces for formation of aqueous membranes. The plurality of cells (11) is formed from a plurality of disks (12) and assembly strips (13). Said disks have a plurality of slots (121) and a plurality of holes (122). Said holes (122) have a perimeter (123). The shape of the hole and the shape of the hole's perimeter should be suitable to form a liquid membrane. As illustrated in FIGS. 5 and 6, preferably, said holes (122) have an oval shape, and preferably, the perimeter (123) of each hole (122) has a toothed shape, to provide the highest contact surface to promote the formation of liquid membranes. Further, said disks (12) have a hollow center (124). The center (124) of the disks (12) defines a chamber (12) inside the cylinder assembly of the membrane and electromagnetic field generation means (10). The means (10), in the preferred embodiment of the invention, have been illustrated as a plurality of membrane cells (11) in a cylinder arrangement. However, as will be evident to one skilled in the art, such arrangement can be changed. For example, they can be arranged as a block of cells through which air circulates, with the proviso that the liquid supplying means must flood or wet said block of cells. A block of membrane generation cells is considered as included within the scope of the present invention.

In addition, the disks (12) also have electromagnetic field generation means (125) to attract metal ions according to the specific polarity in each specific case. Preferably, said electromagnetic field generation means (125) are made up of cables of a conducting material. The shape or arrangement of said means (125) on the disk (12) surface is undulated, as illustrated, but other kinds of configurations are contemplated as well. Preferably, the electromagnetic field generation means (125) are disposed in an alternating configuration with the holes (122), as illustrated in FIG. 5. However, alternating arrangements between holes (122) and means (125) with different regular or irregular patterns also falls within the scope of the present invention. Said means (125) are electrically energized by mechanical rotation means (126), preferably with a positive-ionic charge.

Figure 8:
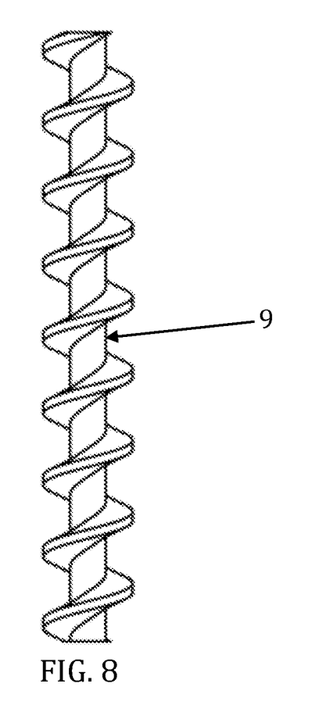
FIG. 8 corresponds to a front view of the means for solids removal of the mass transfer system with solids capturing of the present invention.
Figure 9:
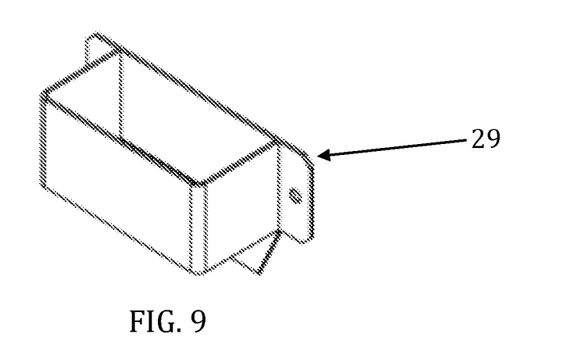
FIG. 9 corresponds to a perspective view of a hopper interacting with the means for solids removal of the mass transfer system with solids capturing capabilities of the present invention.

As seen in FIG. 4, the assembly strips (13) are comprised of rectangular plates having slots, which match the slots (121) of the disks for coupling the same, in order to form the membrane and electromagnetic field generation means (10), which has a structure similar to a cylinder. As will be evident to one skilled in the art, the disks can have a polygonal shape. Said disks having a polygonal shape are considered as included within the scope of the present invention. Additionally, said solids capturing means (8) are comprised of strip-shaped rubberized collectors (81) which are introduced within the space between disks (12), thus fitting therein without hindering their rotation, since they do not block said strips (13). Said rubberized collectors are joined through a main body of the collector (82), which in turn is in contact with a channel (89). In the preferred embodiment, a solids removal means (9) is disposed in a fitted manner within said channel (89). Said removal means (9) is shown in FIG. 8 and is comprised by an endless screw that rotates and allows for removal or entrainment of solids captured in the channel (89) and conducting them out of the housing cover (2) towards the hopper (29), shown in FIG. 9.

Figure 7:
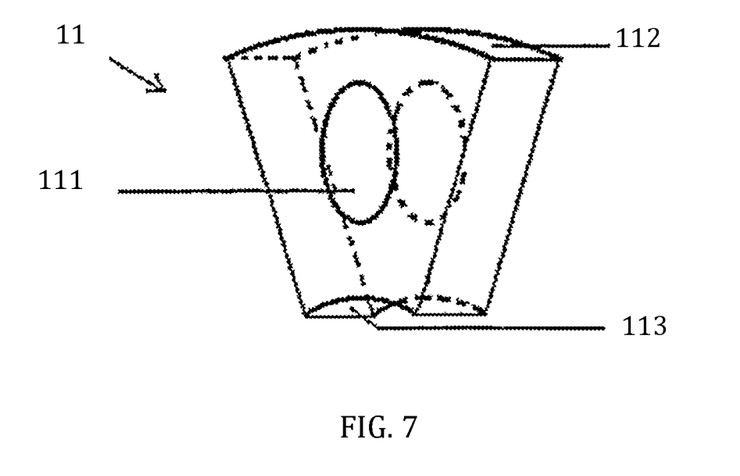
FIG. 7 corresponds to a perspective view of a membrane cell of the mass transfer system with solids capturing of the present invention.

Now, turning to FIG. 7, the membrane cells (11) are formed in the spaces between the disk (12) and strip (13) surfaces. Said cells are in the shape of an irregular cube with one of its faces widened.

During its operation, the membrane and electromagnetic field generation means (10) rotate, so each membrane cell (11) undergoes cyclically the following steps: immersion in the liquid, membrane formation, membrane rupturing, solids capturing, and removal of humid air and solids.

During immersion, the membrane and electromagnetic field generation means (10) are partially immersed in the liquid contained in the base (1) up to a determined level. Due to its rotation, the membrane and electromagnetic field generation means (10) are immersed in the liquid of base (1), so that the liquid covers completely the cells (11).

During membrane formation, the disk (12) rotates so that the cells (11) that were immersed now emerge and the liquid drains back to the base (1). Due to the surface tension of the liquid, aqueous membranes are generated in each cell (11) emerging from the liquid surface. According to FIG. 7, a pair of side membranes (111) is formed in the side holes (122) of cell (11). Further, an upper membrane (112) is formed on the widest portion of the structure, and a lower membrane (113) on the thinnest portion of cell (11). Furthermore, to a lesser extent, internal membranes, not illustrated, parallel to membranes (112) and (113) are formed inside the membrane cell (11). Just one, some, or all of said membranes can be formed. Once the membrane cells (11) emerge from the liquid contained in the base (1), membranes (111, 112 and 113) are formed. The air stream, first, ruptures the upper membrane (112), then enters in the membrane cell (11), and ruptures the side membranes (111) and intermediate membrane, and finally the lower membrane (113), subsequently entering into the chamber (15).

In the membrane-rupturing step, an aqueous membrane is formed from the liquid, and a gas or airflow impinges thereon. The membrane collapses spraying itself into thousands of particles. Particles suspended on air are trapped by the membrane spray and decanted. Cells (11) provide space and time to allow for the sprayed particles, still dispersed in air, to precipitate and agglutinate together. During membrane rupture, suspended solids, both in air or liquid, are directed towards the membrane edges, so they are closer or in contact with any surface of disk (12) as a result of decantation due to the saturation they underwent at the time of membrane rupture. Once the gas stream impinges on the liquid surface, it absorbs an amount of liquid, and the gas enriched with the liquid particles is directed towards the exterior.

On arriving to the solids capturing stage, an electric pulse is run through the electromagnetic field-generation means (125) to provide an electromagnetic field to the assembly means (10), so that the surrounding solids, after the membrane rupture, are attracted to the disk (12), depending on its ionic behavior. Similarly, the solid particles and pollutants present in the gas stream, are decanted as a result of the saturation they were subjected to during membrane rupture, wherein the suspended particles are trapped, their weight is increased, and then precipitated.

Finally, in the stage of humid air and solids ejection, the liquid particles from the collapsed membrane are transferred to the air stream and thus humidifying it. Alternatively, fragrances or disinfectant agents can be added, so these can be transferred also to the air stream. The resulting airflow from the process exits completely clean, humidifying and aromatizing the environment. The liquid spraying due to membrane rupture, promotes liquid transference to the gas stream. The membrane cells (11) have an inlet area, which is greater that the outlet area, thereby due to said feature, the gas stream exits at a higher rate than it enters. Due to the shape of the membrane cells (11), similar to an ejector, the air stream entering the membrane cell (11) is accelerates and directed, at a higher velocity, towards the liquid surface inside the chamber (15). The air is directed towards the liquid surface at an optimum angle, of about 45°, impinging on the surface and absorbing another portion of liquid. It is worth to mention that the airflow can be controlled by calculating the cell sizes and the rotation velocity of the membrane and electromagnetic field generation means (10). The slots (22) on the cover (2) are arranged in order to homogenize the outlet stream of humidified air.

On the other hand, solids attracted to the disk (12) surfaces, due to the electromagnetic field generation means (125), are captured and directed by the rubberized collectors (81), towards the main body of the collector (82). The solids attracted and captured are further directed to the channel (89) where the solids removal means (9) will remove the solids and direct them to the hopper (29) outside the system's housing cover (2).

The mass transfer system with the capturing of solids via electromagnetic field induction of the present invention further comprises electronic or electric control means (not shown) to switch on and off the equipment, the level of liquid, the fan's velocity, the rotation velocity of the membrane and electromagnetic field generation means (10), the electrical current supplied to the liquid, the pulse towards the electromagnetic field generation means (125), and the exit of the solids removal means (9), whereby the outlet gas composition, solids captured and removed, and the final composition of the resulting liquid are controlled.

As will be evident to one skilled in the art, the plurality of disks (12) is manufactured from any suitable material to allow for the formation of an aqueous membrane and capturing of solids by electromagnetic fields. For example, the disks can be made of certain metals that enables either the reaction of different solids, or arrangements of different types of disks (12) in order to boost the solids attraction and capturing possibilities by electrodialysis.

Likewise, it will be evident to one skilled in the art, that the type of gas, liquid and solid used comprise any type as desired and it depends on the application. For example, in a non-exhaustive manner, the mass transfer system with the capturing of solids via electromagnetic field induction of the present invention can be used in seawater desalination applications for industrial, commercial or utility usage; desalination of brine and high-salinity industrial waste; pollutants removal and metal recovering in the mine industry, primarily copper, iron and nickel; generation of controlled environments in greenhouses; air humidification in closed environments, with or without fragrances or bactericidal agents; removal of airborne particles in highly contaminated environments; removal of copper salts in the agricultural industry; and, in general, in any air, liquid, and/or solid filtering system.

The invention claimed is:

1. A mass transfer system with the capturing of solids via electromagnetic field induction, comprising: a housing base containing a liquid, a housing cover having supply and ejection slots thereon, an air convection means, a solids capturing means, a solids removal means; and
    a membrane and electromagnetic field generation means assembly comprising a plurality of membrane cells formed from a plurality of assembly disks and strips; wherein the disks have a plurality of slots and a plurality of holes having a perimeter suitable for formation of a liquid membrane; wherein the center of said disks define a chamber within the assembly;
    the system characterized in that:
    the base, a portion of said base, or only the liquid contained in the base receives an electric charge;
    the disks have a means for generating an electromagnetic field that is electrically energized through mechanical rotation means to provide an electromagnetic field to the means assembly, so that the surrounding solids after the rupture of the liquid membrane are attracted to the disk depending on its ionic behavior;
    wherein the system further comprises:
    solids capturing means fitted radially within the space between the disks, without blocking the assembly strips; and
    solids removal means fitted to the capturing means for removing or dragging said captured solids.

2. The mass transfer system with the capturing of solids via electromagnetic field induction according to claim 1, wherein the system has an upper cover, an internal deflector, a front deflector and a rear deflector.

3. The mass transfer system with the capturing of solids via electromagnetic field induction according to claim 1, wherein the electric charge on the base, a portion of said base or just in the liquid contained in the base is a negative charge.

4. The mass transfer system with the capturing of solids via electromagnetic field induction according to claim 1, wherein the electromagnetic field generation means is electrically energized preferably with a positive ionic charge.

5. The mass transfer system with the capturing of solids via electromagnetic field induction according to claim 1, wherein the material of the base and cover must not react chemically with a gas or said liquid, nor with the solids that are transferred or collected.

6. The mass transfer system with the capturing of solids via electromagnetic field induction according to claim 1, wherein the air convection means comprises any means to force air or gas convection inside the system.

7. The mass transfer system with the capturing of solids via electromagnetic field induction according to claim 1, wherein the air convection means can be selected from an axial fan, a plunger, a turbine, a radial fan, a blower, a compressor, and an intermittent or continuous external airstream, or airstream from a pipeline.

8. The mass transfer system with the capturing of solids via electromagnetic field induction according to claim 1, wherein the holes are oval in shape.

9. The mass transfer system with the capturing of solids via electromagnetic field induction according to claim 1, wherein the perimeter of each hole has a tooth shape.

10. The mass transfer system with the capturing of solids via electromagnetic field induction according to claim 1, wherein the membrane and electromagnetic field generation means is a cylindrical arrangement.

11. The mass transfer system with the capturing of solids via electromagnetic field induction according to claim 1, wherein the electromagnetic field generation means are cables of a conducting material.

12. The mass transfer system with the capturing of solids via electromagnetic field induction according to claim 1, wherein the shape and arrangement of said electromagnetic field generation means is undulated on the disk surface.

13. The mass transfer system with the capturing of solids via electromagnetic field induction according to claim 1, wherein the electromagnetic field generation means is arranged in an alternating manner with said holes.

14. The mass transfer system with the capturing of solids via electromagnetic field induction according to claim 1, wherein the assembly strips are comprised of rectangular plates with slots thereon matching the slots of the disks.

15. The mass transfer system with the capturing of solids via electromagnetic field induction according to claim 1, wherein the disks can be polygonal in shape.

16. The mass transfer system with the capturing of solids via electromagnetic field induction according to claim 1, wherein the membrane cells are formed within the spaces between said disks and strips.

17. The mass transfer system with the capturing of solids via electromagnetic field induction according to claim 1, wherein the membrane cells are in the shape of an irregular cube with one of its faces widened.

18. The mass transfer system with the capturing of solids via electromagnetic field induction according to claim 1, wherein the solids capturing means is comprised of strip-shaped rubberized collectors joined by a main body of the collector, which in turn is in contact with a channel.

19. The mass transfer system with the capturing of solids via electromagnetic field induction according to claim 1, wherein the solids removal means is an endless screw.

20. The mass transfer system with the capturing of solids via electromagnetic field induction according to claim 1, wherein the solids removal means directs the solids towards an external hopper.

21. A method of mass transfer with solids capturing of the system of claim 1, said method characterized in that it comprises the steps of:
    immersing at least one of said plurality of membrane cells in the liquid;
    forming a liquid membrane for at least one of said plurality of membrane cells when said at least one membrane cell passes through the liquid;
    collapsing the liquid membrane when the liquid membrane is put into contact with a gas stream;
    capturing the surrounding solids after the liquid membrane is ruptured by an electromagnetic field to attract them to the disk depending on its ionic behavior; and
    ejecting the gas stream and removing the captured solids.

* * * * *